(12) United States Patent
Hattori et al.

(10) Patent No.: US 7,236,445 B2
(45) Date of Patent: Jun. 26, 2007

(54) OPTICAL HEAD FOR RECORDING AND READING INFORMATION AND OBJECTIVE LENS FOR USE THEREIN

(75) Inventors: Hiroyuki Hattori, Hachioji (JP); Yuichi Atarashi, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 593 days.

(21) Appl. No.: 10/736,637

(22) Filed: Dec. 17, 2003

(65) Prior Publication Data
US 2004/0125736 A1     Jul. 1, 2004

(30) Foreign Application Priority Data
Dec. 20, 2002   (JP)   ............................. 2002-369681

(51) Int. Cl.
G11B 7/00   (2006.01)

(52) U.S. Cl. .............................. 369/112.23; 369/44.23; 369/44.32

(58) Field of Classification Search ..................... None
See application file for complete search history.

(56) References Cited

U.S. PATENT DOCUMENTS

2004/0114245 A1 *   6/2004   Takahashi et al. .......... 359/557

\* cited by examiner

Primary Examiner—Muhammad Edun
(74) Attorney, Agent, or Firm—Finnegan, Henderson, Farabow, Garrett & Dunner, L.L.P.

(57) ABSTRACT

An objective lens used in an optical head having a convex lens and a chromatic aberration correction optical element wherein there is provided a positioning means that positions the center of gravity of the objective lens used in an optical head substantially on a straight line connecting supporting points for the objective lens used in an optical head.

7 Claims, 6 Drawing Sheets

OPTICAL HEAD FOR RECORDING AND READING INFORMATION AND OBJECTIVE LENS FOR USE THEREIN

BACKGROUND OF THE INVENTION

The present invention relates to an optical head for recording and reading information used for a compact disc (CD) device, a digital versatile disc (DVD) device and a magneto-optical disc device (MO) and to an objective lens used in the optical head, and in particular, to those capable of being applied to the aforementioned devices wherein a light source is a blue laser.

The optical head has an objective lens which forms an image of a laser beam on an information recording surface of an optical disk such as CD, DVD and MO as a spot and has a driving means which drives the objective lens for tracking and focusing.

In JP-A No. 5-210860, it is proposed that a position of the center of gravity of an optical head is made to agree positionally with a position of a driving point for the optical head for preventing resonance of the optical head caused in the course of tracking or focusing.

Further, in the objective lens, chromatic aberration is caused by wavelength changes resulted from output changes or temperature changes of a semiconductor laser representing a light source or is caused by changes of refractive index resulted from lens temperatures, however, the chromatic aberration cannot be corrected by the aforesaid one or two convex lenses. Therefore, correction of chromatic aberration conducted by the use of a diffracting lens is proposed in, for example, JP-A No. 6-82725, JP-A No. 6-242373, JP-A No. 7-294707, JP-A No. 11-95145, JP-A No. 11-337818, JP-A No. 2000-81566 and JP-A No. 2002-298422.

Since the objective lens having optical elements for correcting chromatic aberration is composed of a plurality of optical elements, the center of gravity thereof is in a position which is different from that of the center of gravity of the objective lens composed of one optical element. Therefore, if an objective lens having plural optical elements is mounted on a supporting frame of the optical head in the same way as in the conventional objective lens having one optical element, it results in that the objective lens is supported at the position deviated from the center of gravity of the objective lens.

Though the center of gravity of a movable portion in an optical head including an objective lens is made to agree positionally with a driving point, in JP-A No. 5-210860, there still is a problem that movements of the movable portion become complicated to cause a tilt and prevention of vibration becomes difficult, even when the center of gravity of the entire movable portion is made to agree with its driving point, if the center of gravity of the objective lens is deviated from its supporting point, which has been a problem.

In FIG. 12 of JP-A No. 5-210860, there is described an optical head wherein an objective lens is arranged at the position that is away from the driving point of a movable portion including an objective lens, and in FIG. 14, there is described an optical head wherein an objective lens is arranged on a line connecting driving points substantially. However, there is a possibility that the problems mentioned above are still caused on both optical heads described in FIG. 12 and FIG. 14 in JP-A No. 5-210860.

SUMMARY OF THE INVENTION

An object of the invention is to solve the problems of this kind.

The object stated above is attained by either one of the following Structures 1–5.

Structure 1: An objective lens used in an optical head having a convex lens and a chromatic aberration correcting optical element wherein there is provided a positioning means that positions the center of gravity of the objective lens used in an optical head substantially on a straight line connecting supporting points for the objective lens used in an optical head.

Structure 2: The objective lens used in an optical head described in Structure 1 wherein a lens frame is provided and the center of gravity mentioned above is a combined center of gravity of the entire objective lens including the convex lens, the chromatic aberration correcting optical element and the lens frame.

Structure 3: The objective lens used in an optical head described in Structure 1 or Structure 2 wherein the convex lens is of a one-element structure.

Structure 4: The objective lens used in an optical head described in Structure 1 or Structure 2 wherein the convex lens is of a two-element structure.

Structure 5: An optical head for recording and reading information equipped with an objective lens used for an optical head having a convex lens and a chromatic aberration correcting optical element wherein the center of gravity of the objective lens used for an optical head is positioned substantially on a straight line connecting supporting points for the objective lens used for an optical head.

Each of FIGS. 4(a) and 4(b) is a sectional view of an example of an objective lens for the optical head relating to the embodiment of the invention.

Figure 5:
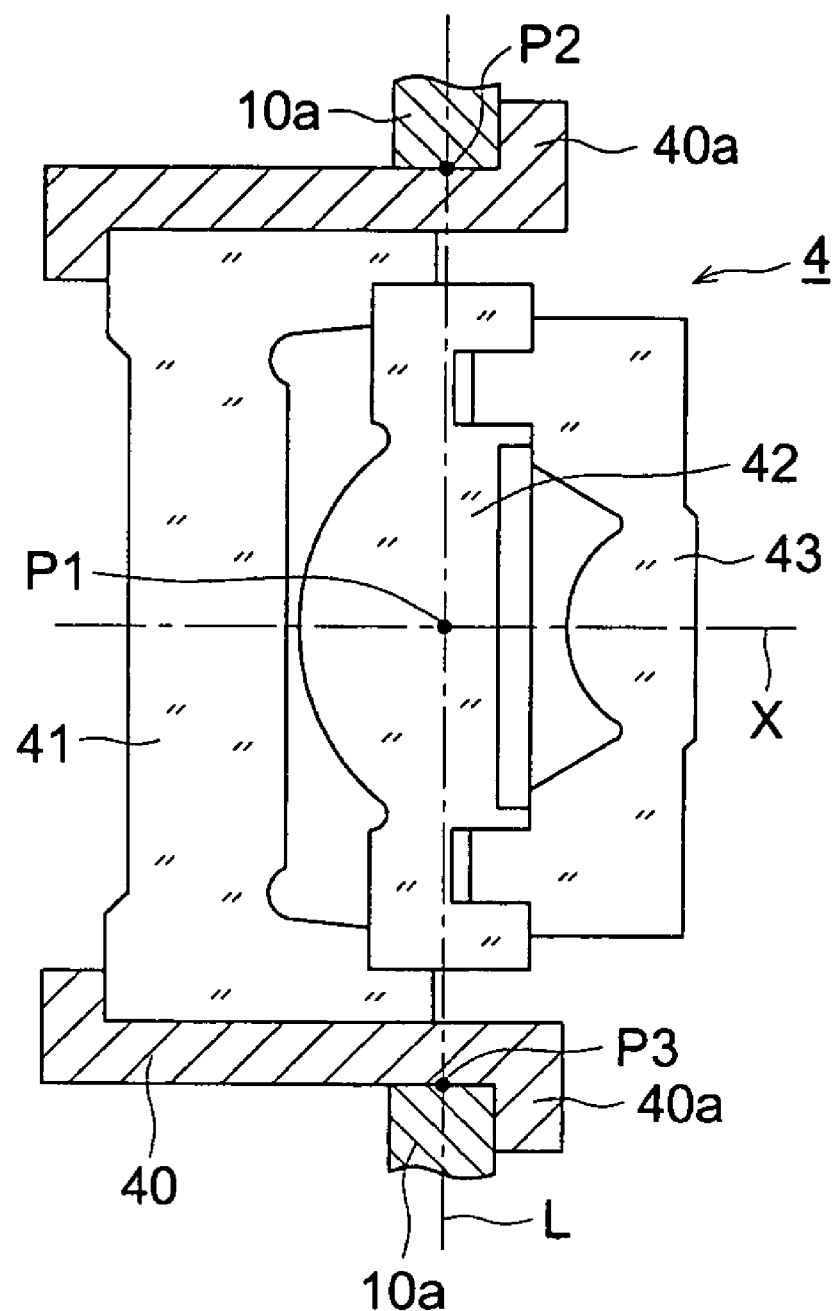

FIG. 5 is a sectional view of another example of an objective lens for the optical head relating to the embodiment of the invention.

Figure 6:
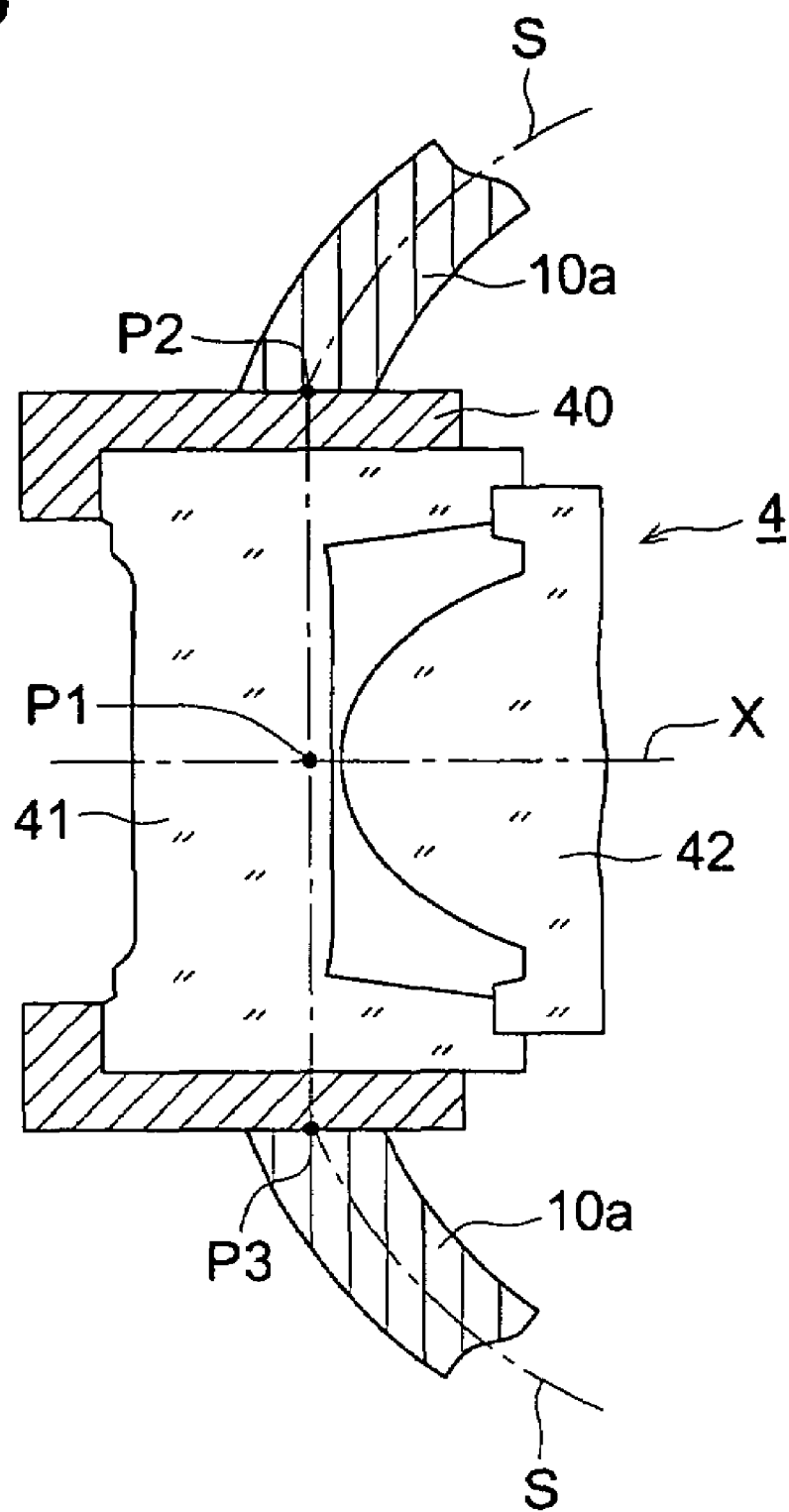

FIG. 6 is a sectional view of still another example of an objective lens for the optical head relating to the embodiment of the invention.

Figure 7:
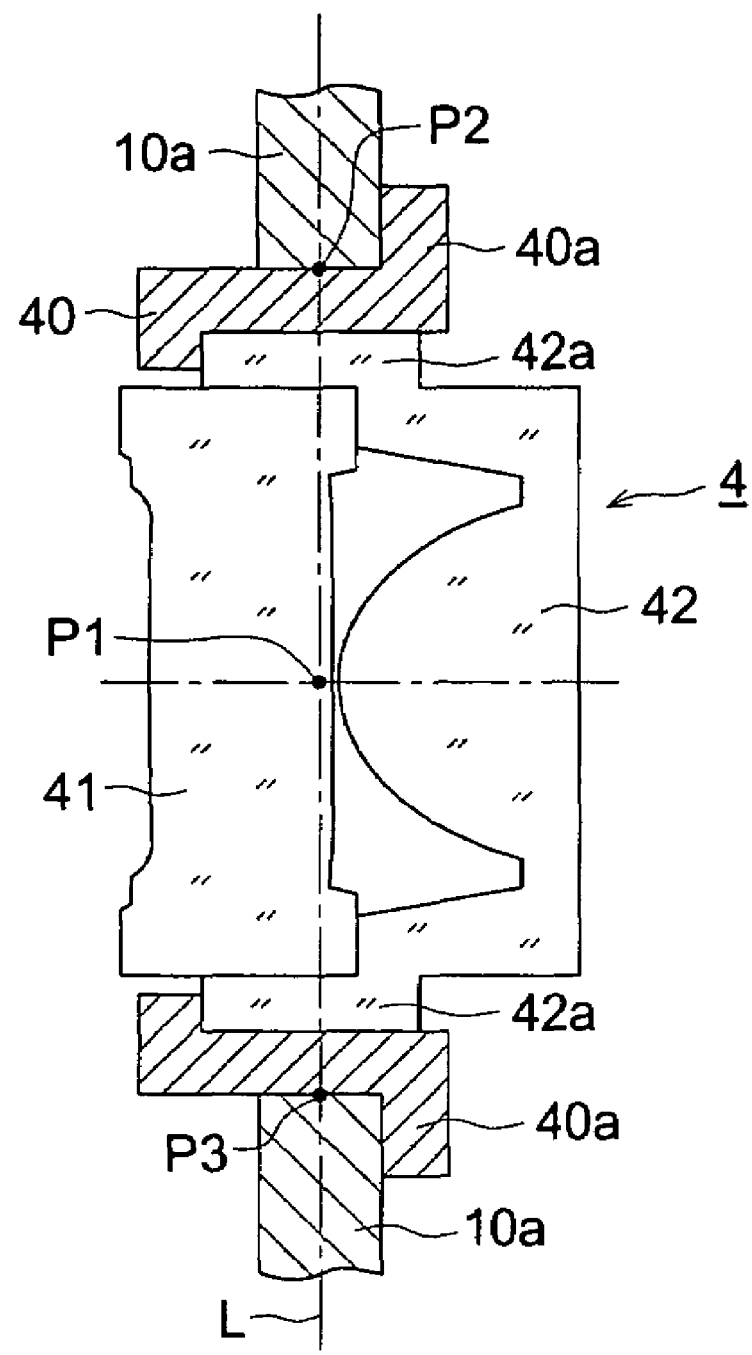

FIG. 7 is a sectional view of still further another example of an objective lens for the optical head relating to the embodiment of the invention.

DETAILED DESCRIPTION OF THE PREFERRED EMBODIMENT

Figure 1:
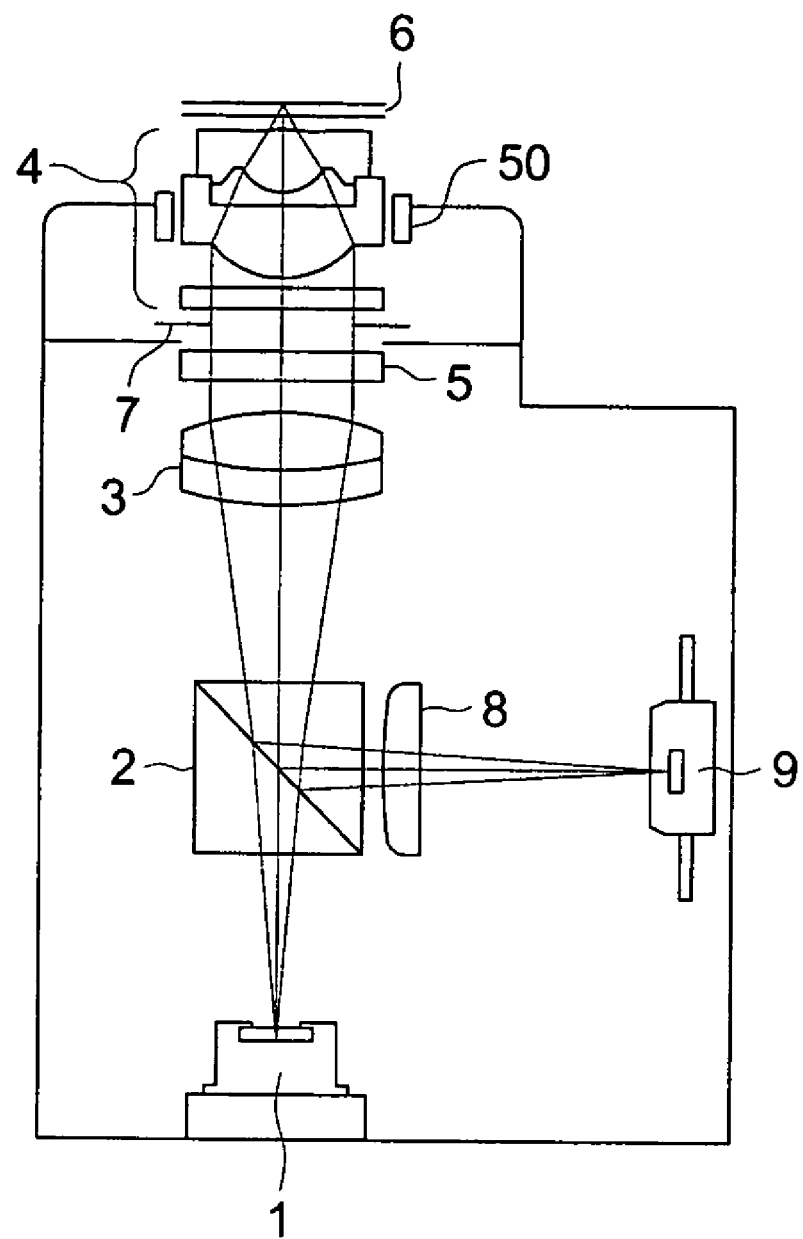
FIG. 1 is a diagram showing an outline of an optical head for recording and reading information.

FIG. 1 shows an outline of an optical head for recording and reading information, and in the optical head, a light flux emitted from semiconductor laser 1 representing a light source is transmitted through beam splitter 2 representing a light composing and separating means to be transformed into a parallel light flux by collimator lens 3 and is transmitted through quarter-wave plate 5 to be stopped down by diaphragm 7 to a prescribed numerical aperture to be converged for image forming as a spot on an image recording surface of optical disc 6 representing an information recording medium such as CD, DVD and MO through objective lens 4.

The reflected light flux modulated by information pits on the information recording surface of the optical disc 6 turns into a parallel light flux again through objective lens 4, and it further passes through diaphragm 7, quarter-wave plate 5 and collimator lens 3 to become a converged light, and is reflected on beam splitter 2 to pass through cylindrical lens 8, and is subjected to correction of astigmatism and magnification change to be converged on a photosensitive surface of photodetector 9. Numeral 50 in the figure represents a magnetic driving mechanism as a driving means for focusing and tracking, and it is constructed to drive objective lens 4 with magnetic driving mechanism 50.

In reading of information, an output of photodetector 9 is used as reading information, and in recording of information, information is recorded on an information recording surface of optical disc 6 by light that is emitted from semiconductor laser 1 in which information has been modulated.

Figure 2:
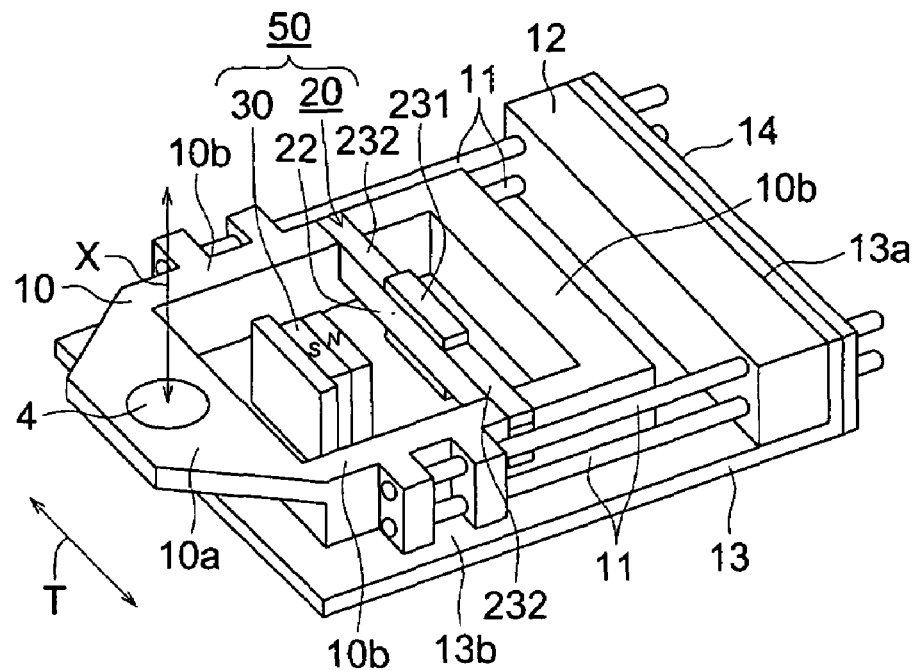
FIG. 2 is a perspective view of an optical head for recording and reading information relating to the embodiment of the invention.

FIG. 2 is a perspective view of an example of the optical head for recording and reading information relating to the embodiment of the invention. The objective lens driving mechanism in the example is of a wire suspension method wherein holder 10 representing a movable side member which holds objective lens 4 is supported on the side of apparatus frame 13 representing a fixed member, while being held under the condition to be movable in tracking direction T and focusing direction X (optical axis direction) by four wires 11.

There is further provided magnetic driving mechanism 50 of a moving coil type as a driving means for moving the holder 10 in the tracking direction T and in the focusing direction X. This magnetic driving mechanism 50 is composed of driving coil unit 20 housed in the holder 10 and driving magnet 30 that is mounted on the side of apparatus frame 13 to face the driving coil unit 20.

The holder 10 has therein trapezoidal lens holder 10a having on its center objective lens 4 and frame portion 10b that extends downward in a square barrel shape whose one side is represented by the base of the lens holder 10a. The holder 10 forms, in its inside, a rectangular holding space with the frame portion 10b and lens holder 10a. On the lens holder 10a, there is mounted objective lens 4 so that its optical axis may be in the direction of X.

A base end portion of each of four wires 11 which support the holder 10 is supported by supporting plate portion 13a that is formed by lifting a part of apparatus frame 13 vertically, through flat-board-shaped gel pot 12 having a framework filled with gel agents. It is further soldered on wiring base board 14 that is mounted on the back of the supporting plate portion 13a. The gel pot 12 is one for absorbing unwanted vibration caused on the wire 11 when the holder 10 is driven, while, the wiring base board 14 is one for supplying electricity to driving coil unit 20 by utilizing wire 11.

On bottom plate portion 13b of the apparatus frame 13, there is fixed driving magnet 30.

Figure 3:
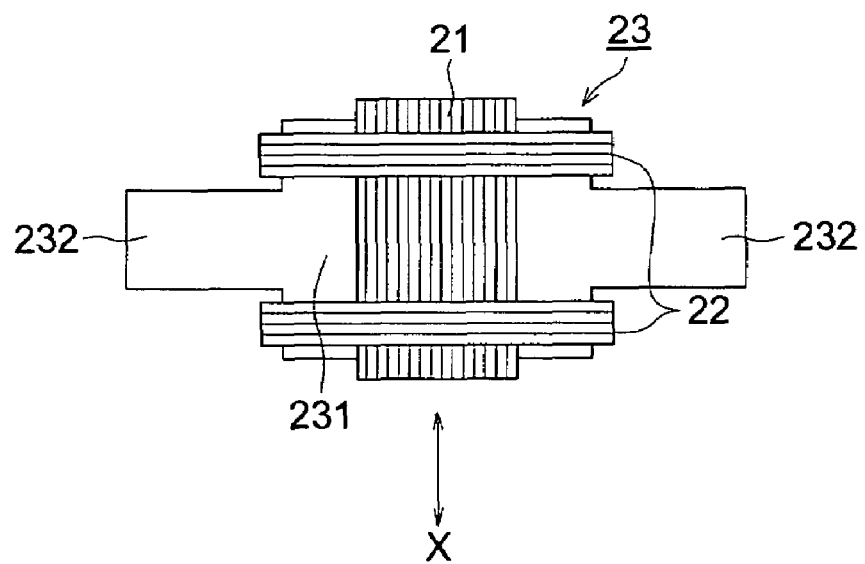
FIG. 3 is a diagram of a driving coil unit.

On the frame portion 10b, there is attached driving coil unit 20. The driving coil unit 20 is composed of tracking coil 21, focusing coil 22 and yoke 23. The yoke 23 is composed of central yoke main body 231 and yoke arms 232 on both sides. As shown in FIG. 3 representing a diagram of the driving coil unit 20, the tracking coil 21 is wound around the yoke main body 231 to have a winding portion that is in parallel with optical axis direction X, and the focusing coil 22 is wound around the yoke main body 231 to be perpendicular to the optical axis direction X. The yoke arm 232 of the driving coil unit 20 is fixed on frame portion 10b of the holder 10.

The tracking coil 21 and the focusing coil 22 are opposite to the driving magnet 30, and the tracking coil 21, the focusing coil 22 and the driving magnet 30 are arranged in the holding space that is formed inside the holder 10.

Tracking signals generate driving power on the tracking coil 21, which moves objective lens 4 in the direction of arrow T for tracking, and focusing signals generate driving power on the focusing coil 22, which moves objective lens 4 in the optical axis direction X for focusing.

For example, as is studied in JP-A No. 5-210860, when the driving coil unit 20 is driven, resonance generated by moments which are determined by the positional relationship between the center of gravity of the driving coil unit 20 and its driving point result in a problem in tracking and focusing. Therefore, establishment of the center of gravity of the driving coil unit is important in a design of the optical head, and when objective lens 4 is composed of a plurality of optical elements as stated above, if the center of gravity of the objective lens unit is deviated from its holding position, there are caused problems that a tilt of the objective lens 4 comes into existence, or establishment of the center of gravity of the driving coil unit 20 at an appropriate position is difficult.

In the present embodiment, the problems stated above are solved by making the position of the center of gravity of the objective lens unit composed of plural optical elements to agree substantially with the supporting position for the objective lens unit.

Figure 4:
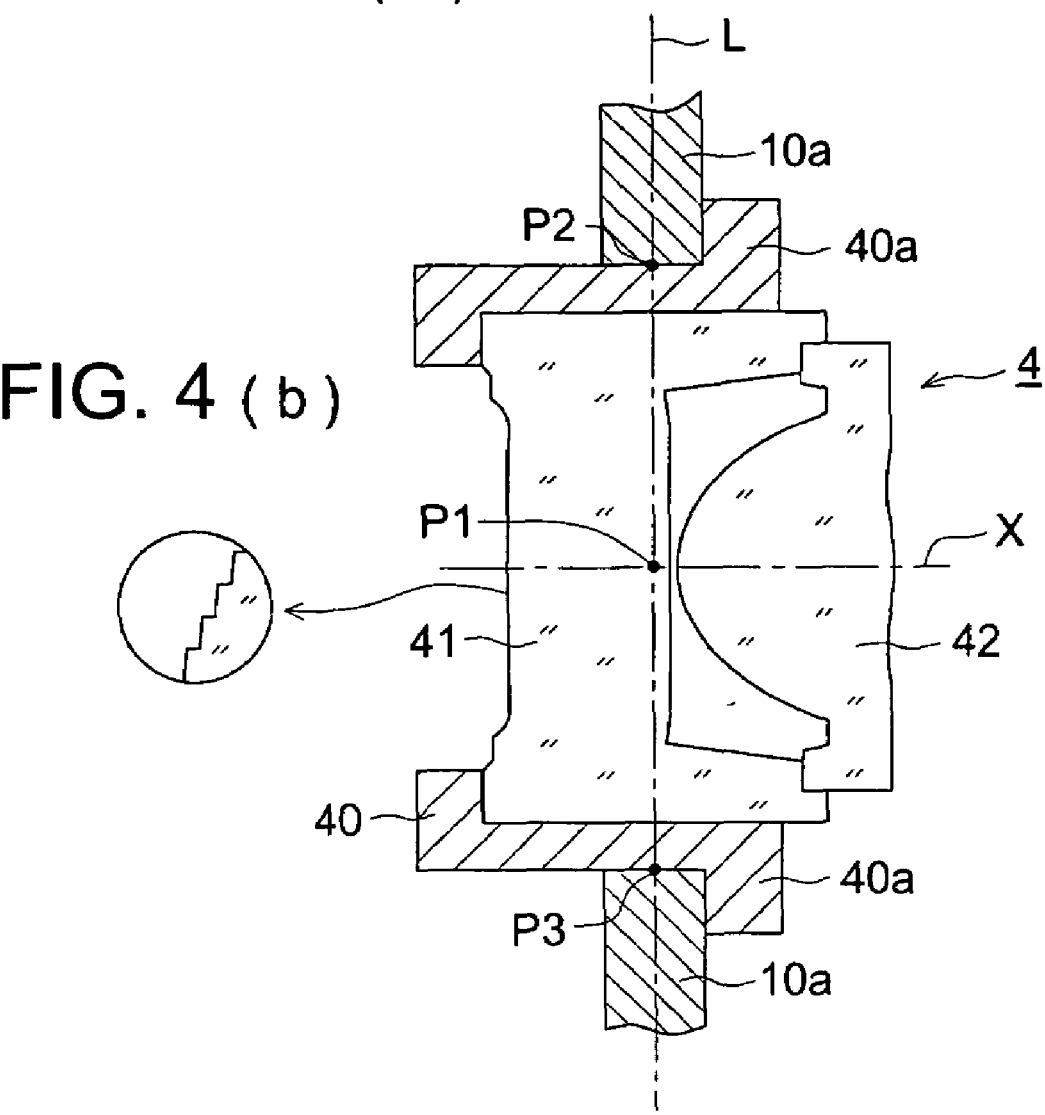

Each of FIGS. 4(*a*) and 4(*b*) is a sectional view of an example of the objective lens for the optical head relating to the present embodiment of the invention. The objective lens 4 is composed of lens frame 40 that is called a bobbin, diffracting lens 41 and convex lens 42.

The diffracting lens 41 is an optical element for correcting chromatic aberration, and it corrects chromatic aberration caused by changes in the refractive index of the lens resulting from changes in the oscillation wavelength of semiconductor laser 1 and from changes in temperatures. The diffracting lens 41 has a diffracting surface, and the diffracting surface has microscopic diffraction stripes which are formed to be ring-shaped zones having centers on the optical axis, as shown in FIG. 4 (*b*). The diffracting lens 41 is one for correcting chromatic aberration by generating aberration so that chromatic aberration caused by convex lens 42 may be canceled, and it may be either a flat-board-shaped optical member having no refractive power or the one wherein a diffracting surface is provided on one surface of the lens having refractive power, and for example, it is possible to use those disclosed in JP-A No. 6-82725, JP-A No. 6-242373, JP-A No. 7-294707, JP-A No. 11-95145, JP-A No. 11-337818, JP-A No. 2000-81566 and JP-A No. 2002-298422 which are made of plastic mold lens. The numeral 42 is a convex lens that converges parallel light on an information recording surface of optical disc 6, and transforms reflected radiation light on the information recording surface of optical disc 6 into parallel light, and a glass mold lens is preferably used for the illustrated single lens structure, and a plastic mold lens may also be used.

A flange portion of the diffracting lens 41 is fixed on lens frame 40 through a means of adhesion, and a flange portion of the convex lens 42 is stuck on the flange portion of the diffracting lens 41 so that the convex lens may be fixed on the diffracting lens 41. The lens frame 40 is fitted to a circular hole provided on lens holder 10a to be fixed through a means of adhesion.

In the course of connection between the lens frame 40 and the lens holder 10a, when the center of gravity of the combination of the lens frame 40, diffracting lens 41 and convex lens 42 is positioned at P1, positional relationship is established so that a line connecting supporting points P2 and P3 by lens holder 10a may pass through combined center of gravity P1. Each of supporting points P2 and P3 is a point where line L that passes through the center in the thickness direction of lens holder 10a intersects the line where lens holder 10a and lens frame 40 are in contact each other. By establishing the combined center of gravity P1 of the total of objective lens 4 including lens frame 40, diffracting lens 41 and convex lens 42 to be positioned substantially on the straight line connecting supporting points P2 and P3 as stated above, the center of gravity of the movable portion is not moved in the optical axis direction X even when the objective lens 4 is mounted on the lens holder 10a, which makes it easy to design a means to prevent vibration in tracking and focusing, and makes it possible to prevent vibration satisfactorily.

The positional relationship between lens holder 10a and lens frame 40 is established by a supporting surface of flange 40a representing a positioning means provided on the lens frame 40. Therefore, the position of the supporting surface of flange 40a is established in accordance with the position of the center of gravity of the objective lens 40.

When the diffracting lens 41 is incorporated, the position of combined center of gravity P1 is changed, in many cases, to a position that is deviated greatly toward the diffracting lens 41 from the position of the center of gravity of convex lens 42 itself.

Incidentally, it is also possible to omit lens frame 40 by providing, on a flange of diffracting lens 41 or convex lens 42, a supporting surface that is engaged with lens holder 10a.

FIG. 5 shows an example wherein a convex lens is composed of two convex lenses 42 and 43. For this convex lens of a two-element structure, a plastic mold lens is preferably used.

Even in the lens structure in FIG. 5, a supporting surface of flange 40a of lens frame 40 is established so that center of gravity P1 of objective lens 4 composed of lens frame 40, diffracting lens 41 and convex lenses 42 and 43 may be positioned substantially on the line connecting supporting points P2 and P3 of lens holder 10a.

FIG. 6 shows an example wherein a lens supporting portion of lens holder 10a is not flat-board-shaped but is curved. Even in the structure wherein lens holder 10a is curved as shown in FIG. 6, each of supporting points P2 and P3 is a point where line S that passes through the center in the thickness direction of lens holder 10a intersects the line where lens holder 10a and lens frame 40 are in contact each other, in the same way as that explained above.

Incidentally, though there has been explained relationship between the center of gravity of objective lens 4 and the supporting point in the optical axis direction X, in establishment of the relationship between the center of gravity and the supporting point in the direction perpendicular to the optical axis direction X, the aforementioned center of gravity and the supporting point agree with each other automatically, because of the structure wherein lens frame 40 is fitted to a circular supporting hole provided on lens holder 10a.

FIG. 7 shows an example wherein convex lens 42 is supported by lens frame 40 and diffracting lens 41 is supported by the convex lens 42. Namely, flange 42a is provided on the convex lens 42, and diffracting lens 41 is supported by the flange 42a, and the flange 42a is supported by the lens frame 40. In this example, the position of the diffracting lens 41 is established on the basis of the position of the convex lens 42.

In the invention described in either one of Structures 1–5, a tilt and a vibration of an objective lens which tend to be caused in the course of tracking or focusing can be prevented satisfactorily. Therefore, by using an optical element for correcting chromatic aberration, it is possible to realize an optical head for recording and reading information capable of reading and recording information stably even in the objective lens composed of plural optical elements or to realize an objective lens for use therein.

What is claimed is:

1. An objective lens used in an optical head, comprising:
   (a) a convex lens; and
   (b) a chromatic aberration correcting optical element,
   wherein a center of gravity of the objective lens is arranged substantially on a straight line connecting supporting points of a lens holder for the objective lens.

2. The objective lens of claim 1, further comprising a lens frame for supporting the convex lens and the chromatic aberration correcting optical element, wherein the center of gravity of the objective lens is a combined center of gravity of the entire objective lens including the convex lens, the chromatic aberration correcting optical element and the lens frame.

3. The objective lens of claim 1, wherein the convex lens has a one-element lens.

4. The objective lens of claim 1, wherein the convex lens has a two-element lens.

5. An optical head for recording and reading information including an objective lens used for an optical head, the objective lens comprising:
   (a) a convex lens; and
   (b) a chromatic aberration correcting optical element,
   wherein a center of gravity of the objective lens is arranged substantially on a straight line connecting supporting points of a lens holder for the objective lens.

6. An objective lens used in an optical head, comprising:
   (a) a convex lens; and
   (b) an aberration correcting optical element,
   wherein a center of gravity of the objective lens is arranged substantially on a straight line connecting supporting points of a lens holder for the objective lens.

7. An optical head for recording and reading information including an objective lens used for an optical head, the objective lens comprising:
   (a) a convex lens; and
   (b) an aberration correcting optical element,
   wherein a center of gravity of the objective lens is arranged substantially on a straight line connecting supporting points of a lens holder for the objective lens.

* * * * *